United States Patent [19]

Reischl et al.

[11] Patent Number: 4,834,003

[45] Date of Patent: May 30, 1989

[54] COMBUSTION OF AQUEOUS SEWAGE SLUDGE BY THE FLUIDIZED BED PROCESS

[75] Inventors: Artur Reischl, Hoechenschwand; Friedhelm Sahlmen, Moers, both of Fed. Rep. of Germany

[73] Assignee: Bayer Aktiengesellschaft, Leverkusen, Fed. Rep. of Germany

[21] Appl. No.: 236,087

[22] Filed: Aug. 24, 1988

[30] Foreign Application Priority Data

Aug. 26, 1987 [DE] Fed. Rep. of Germany ....... 3728398

[51] Int. Cl.⁴ .............................................. F23G 5/00
[52] U.S. Cl. ................... 110/346; 110/238; 110/245; 210/609
[58] Field of Search ....................... 110/245, 238, 346; 210/609

[56] References Cited

U.S. PATENT DOCUMENTS 3,994,244  11/1976  Pledger et al. ..................... 110/245
4,287,069   9/1981  Reischl et al. ..................... 210/609

*Primary Examiner*—Edward G. Favors
*Attorney, Agent, or Firm*—Gene Harsh; Joseph C. Gil; Richard E. L. Henderson

[57] ABSTRACT

This invention relates to a process for the combustion of aqueous sewage sludge comprising burning, in a fluidized bed furnace, an aqueous mixture of a sewage sludge and a TDI residue, said aqueous mixture having a total solids content of from 25 to 98% by weight of the aqueous mixture, wherein the TDI residue comprises 25 to 95% by weight of the total solids content.

8 Claims, No Drawings

COMBUSTION OF AQUEOUS SEWAGE SLUDGE BY THE FLUIDIZED BED PROCESS

BACKGROUND OF THE INVENTION

This invention relates to a process for the self-feeding combustion of a mixture of sewage sludge and polymeric TDI residues in fluidized bed furnaces.

A multi-stage process using TDI residues that result from the production of monomeric tolylene diisocyanates ("TDI") has been described in DE-OS No. 2,920,526 as providing improved disosal of sewage sludges of the kind obtained as surplus clarification sludges in biological clarification plants. Improvements in the settling processes of sewage sludges and improvement in partial sludge dewatering are described for this process. The reference also describes the combustion of sewage sludges mixed with TDI residues in fluidized bed furnaces, using quartz sand as fluidized bed material. According to this reference, combustion of mixtures which have a solids content of up to 32.2% by weight can be achieved only by using considerable quantities of energy sources such as coal, natural gas or fuel oil.

Any increase in the solids content was considered impossible, however, because of concerns that the level of nitrogen oxides in the fuel gas would rise above the permissible limit due to the high nitrogen content in the sewage sludges (about 5 to 8% by weight) and the TDI residues (16.8 to 17.2% by weight). It was therefore not to be expected that one could burn improved mixtures of sewage sludges and a high proportion of nitrogen-containing TDI residues without supplying the usual energy sources and without producing environmental and processing problems.

It was, therefore, all the more surprising to find that aqueous sewage sludges containing TDI residues could be burned trouble-free under environmentally benign conditions by using a completely self-feeding fluidized bed process in which the concentration of solids in the mixture and the concentration of TDI residue are kept within certain limits.

SUMMARY OF THE INVENTION

The present invention relates to a process for the combustion of aqueous sewage sludges in fluidized bed furnaces wherein aqueous mixtures of sewage sludges and TDI residues having a total solids content of from 25 to 98% by weight (preferably from 35 to 95%) based on the weight of the aqueous mixture, wherein the TDI residues comprise from 25 to 95% by weight (preferably from 45 to 85%) of the total solids content, are burned without additional supply of energy sources.

DETAILED DESCRIPTION OF THE INVENTION

Combustion in fluidized bed furnaces is known. For the combustion according to this invention, temperatures of from 650° to 870° C., preferably from 730° to 800° C., should be maintained in the fluidized bed and temperatures of from 850° to 1050° C., preferably from 850° to 950° C., should be maintained in the furnace chamber. Any of the conventional materials may be used as fluidized bed material, including coal boiler ash, quartz sand, basalt gravel, or pumice or limestone granulate, with fine coal boiler ash being particularly preferred. The particle sizes of fluidized bed material should be from 0.5 to 3.5 mm, preferably from 0.5 to 2.5 mm. When the process according to the invention is used for burning sewage sludges containing inorganic salts, it is advisable to renew up to 10% by weight of the fluidized bed material as soon as the mass of fluidized bed contains more than 5% by weight of inorganic salts, as described in EP No. 3831.

Tolylene diisocyanate ("TDI") residues that may be used according to the present invention for burning sewage sludges are described in DE-OS No. 2,920,526.

The TDI residues to be used for the process according to the invention are almost always formed in conventional large scale technical processes for the production of 2,4- and/or 2,6-tolylene diisocyanate, as already mentioned above. These residues are relatively high molecular weight, tar-like masses which are cross-linked through covalent bonds and which are generally formed in a quantity of over 10% by weight based on the calculated quantitative yield of monomeric diisocyanates. For ease in handling, the TDI residues are generally introduced, after the process of distillation, into water in a stirrer vessel at a temperature above 130° C. A greater part of the free isocyanate groups then react to form polyurea groups (hereinafter termed "denaturing" of the TDI residue) to form a coarse, irregularly shaped, insoluble slag. Although this slag still contains free isocyanate groups (generally less than 15% by weight, in most cases 1 to 10% by weight), it is virtuaally free from monomeric diisocyanates. In addition to these isocyanate groups, the TDI residue slags contain varying proportions, depending on the denaturing process, of urea, biuret, uretdione, isocyanurate, carbodiimide, uretoneimine, and optionally also methyl benzimidazolone groups, as well as the products of their biuretization. The slags are so highly cross-linked through the various functional groups that, even when they have an average particle size of less than 5 $\mu$m, they are virtually insoluble in inert organic solvents such as methylene chloride, cyclohexane, toluene, xylene or dichlorobenzene, even at the boiling point. In boiling dimethylformamide, the pulverized residue swells to a certain extent but does not dissolve. When heated, only a very small proportion, if any, of the TDI distillation residues used according to the invention soften at temperatures somewhat above 250° C. However, at temperatures upwards of about 280° C. the distillation residues undergo decomposition with evolution of gas but do not melt.

The TDI residue slag is typically formed as very coarse particles tht may be wet with water or suspended in water in the stirrer vessel in the denaturing process. The TDI residue slag is preferably first reduced in size to particles smaller than 3 mm using a suitable apparatus, such as a granulator cutter or a hammer mill, and, if necessary, is then ground down to the required final state by a known wet or dry process.

If the TDI residues are obtained in water or are wet with water (for example from the large scale technical denaturing process described above), it is particularly economical and environmentally advantageous to reduce the size of the coarse TDI slag by wet grinding in part of the aqueous sewage sludge suspension (generally at a concentration of about 0.3 to 3%) in the settling tank. This process may be carried out batchwise or, preferably, continuously in apparatus optionally arranged in two sequential stages. The solids concentrations of these mixtures during wet grinding is preferably from 10 to 45% by weight. Apart from tube mills and ball mills, it is particularly advantageous to use toothed colloid mills, trigonal mills, gear ring mills, corundum disc mills, or ball mills with stirrers, depending on the particle size required.

The TDI residue slags obtained from wet grinding, which still contain varying quantities of free isocyanate groups, depending on the method employed, are used either as very finely divided suspensions or pastes or as powders in the same way as the TDI residue powders obtained from dry grinding.

If TDI residue slags are to be reduced in size by dry grinding, they are precrushed to particles smaller than 2 to 3 mm and predried, preferably at temperatures below 50° C., so that their moisture content is not significantly above 15% by weight, preferably below 5% by weight. The choice of machine used for dry grinding will depend mainly on the desired fineness and grain size distribution, but the cost of grinding is also a major factor. The residue slags used according to the invention are very hard compared with synthetic resins and, owing to their high degree of cross-linking, they can be ground in conventional size reduction machines at temperatures of up to about 250° C. without any cooling problems and without softening. This is particularly important for obtaining a very finely ground product.

The apparatus used may be, for example, pinned disc mills, ball mills or impact disc mills, or mills of the air current type, such as cross beater mills, toothed ring mills or turbo mills. However, steam or air jet mills are particularly preferred because size reduction in such mills is achieved mainly by the impact between particles rather than by impact against the walls of the apparatus, producing very fine grains with only a single passage through the apparatus.

Dry size reduction may, of course, also be carried out as a single stage or a multistage process, either continuously or batchwise.

The TDI residue powders may be subjected to a wide variety of chemical modifications before they are used in the process according to the invention. These modification reactions, which may partly already take place during the grinding process, may be carried out either in the bgaseous phase or in the presence of a liquid reaction medium. In particular, they may involve reaction of the small quantities of free isocyanate groups still present in the TDI residue powders. Thus, for example, gaseous ammonia or gaseous amines may be passed through the finely ground TDI distillation residue, preferably on the counterflow principle, to remove the isocyanate groups by an exothermic reaction which is completed within a very short time (even less than 1 minute, depending on the degree of fineness of the powder), even without mechanical mixing. Such reactions are accompaied by the formation of additional urea groups in the TDI distillation residue. These urea groups very readily undergo condensation reactions with carbonyl compounds, in particular formaldehyde, which may be passed through the powder either at the same time or after the reactions with ammonia or amines. Instead of formaldehyde-ammonia mixtures, urotropine may be used under hydrolyzing conditions to form methylene urea bridges. Suitable volatile amines used for these reactions are, for example, ethylamine, diethylamine, dimethylamine, butylamine, dibutylamine, ethylenediamine, and propylenediamine. Examples of suitable carbonyl compounds, apart from formaldehyde, include acetaldehyde, propionaldehyde, butyraldehyde, acetone, and methyl ethyl ketone.

Another gas-phase modification reaction involves reaction with steam. Whereas the reaction of the free isocyanate groups in the finely powdered residue slag with steam alone proceed slowly at temperatures below 100° C., even when finely ground TDI distillation residues are used, quantitative formation of polyurea may be rapidly obtained when reaction temperatures significantly above the boiling point of water (preferably above 130° C.) are employed. If the TDI residue slags have been sufficiently reduced in size, it is sufficient to wet them with water and expose them to the above mentioned temperatures without further mixing. Aqueous ammonia, aqueous amine solutions or alcohols and carboxylic acids may, of course, be used in analogous manner in a gaseous state for modification reactions with the free isocyanate groups. Methanol, ethanol, propanol, isopropyl alcohol, butanol, ethylene glycol, formic acid, or acetic acid, for example, may be used for this purpose. TDI residues modified by this method are preferably used in the process according to the invention.

For modifying the TDI residue powder in water or an inert organic solvent as reaction medium, it is particularly useful to carry out reactions between the free isocyanate groups using catalysts. Examples of such reactions are the formation of uretdione groups in the presence of dimerization catalysts, such as trisubstituted phosphines, and the formation of carbodiimide groups in the presence of phospholine oxide. Another possible modification consists of the addition of weakly acid compounds (e.g., bisulfite or other isocyanate releasing compounds) to the free isocyanate groups of the pulverized TDI residue slags. Whenever subsequently desired, these added compounds may be split off at elevated temperatures to release the isocyanate groups. A wide variety of modification reactions may, of course, also be carried out in the liquid phase, in particular with compounds containing groups which will react with the isocyanate groups of the residue powder (particularly hydroxyl, amino and/or carboxyl groups). Anionic and/or cationic groups or groups capable of salt formation may be introduced into the residue powder by such modification reactions. Most such compounds react not only with the free isocyanate groups in the residue but also with the carbodiimide bonds. Suitable monohydric and polyhydric alcohols, amines, and carboxylic acids, which may also contain other functional groups (for example, ionic groups and/or groups capable of salt formation), have been described as reactants for polyisocyanates in the in situ preparation of polyisocyanate-polyaddition products in polyhydroxyl compounds. For example, DE-OS Nos. 2,550,796 and 2,550,797. Amines suitable for modification reactions are also described in DE-OS No. 2,714,289 and suitable carboxylic acids are described in DE-OS No. 2,714,293 (in connection with the addition of such compounds to carbodiimide groups). According to DE-OS No. 2,714,292, phosphites may also be added to the carbodiimide bonds of the TDI residue powder to form phosphonoformamidine groups. The modification reactions with carbonyl compounds already described above may, of course, also be carried out in a liquid reaction medium. Suitable carbonyl compounds are described, for example, in DE-OS No. 2,639,254.

Both aerobic and anaerobic biological purification of effluent result in the formation of surplus activated sludge (clarification sludge). In aerobic biological effluent purification, the organic compounds dissolved in water are mainly converted into carbon dioxide and water by microorganisms consisting mainly of bacterial mixed cultures and fungi which take in oxygen supplied to the effluent; new bacterial masses are formed in the process.

The propagation of the microorganisms gives rise to large quantities of so-called surplus activated sludge that must be continuously removed by sedimentation and preliminary dewatering, preferably on comb filter presses or screen belt presses or by centrifuging or decanting.

The sewage sludge is generally at a concentration of 0.1 to 0.8% by weight in the activated tank and is concentrated to about 10 to 50% by weight by the subsequent preliminary dewatering, optionally with the addition of inorganic additives.

Although the rate of propagation of microorganisms is much lower in anaerobic biological purification, such that much less surplus activated sludge is formed, this sludge must still be removed.

Combustion of the aqueous sewage sludge and of the TDI residue in the fluidized bed furnace is preferably carried out by introducing the two components separately into the fluidized bed or by mixing the two components immediately before their entry into the furnace chamber (for example, using a paddle screw) using temperature-regulated dosing devices. If the aqueous mixtures introduced into the fluidized bed for combustion still contain inorganic salts, then a proportion of the fluidized bed material, i.e. from 5 to 20% by weight thereof, must be replaced, as already mentioned above, when the concentration of inorganic salt in the fluidized bed material rises above 5%. For this purpose, the fluidized bed material is preferably removed by means of a bucket wheel sluice and a trough chain conveyor, and the fluidized material laden with incrustations of salt is introduced while still hot into a water bath in which most of the salt dissolves. The regenerated material may then be returned to the fluidized bed.

The organic sulfur and chlorine compounds present in the substances put into the combustion process are present in the flue gas as sulfur dioxide and hydrogen chdloride. According to DE No. 3,326,832, these noxious substances may be oxidized or neutralized with oxidizing and/or alkaline solutions injected using very fine jets into the hot stream of exhaust gas in quantities regulated according to concentrations measured in the pure gas. The treated material may then be deposited in filtration plants. Other known processes for reducing the amount of noxious substances in flue gases may also be employed.

One special advantage of the process according to the invention is that the $NO_x$ content in the flue gas is much lower than would have been expected on the basis of the nitrogen content present in the denatured TDI residues and the sewage sludge.

When aqueous mixtures put into the combustion process according to the invention have a solids content composed of approximately equal parts by weight of sewage sludge and TDI residue and their solids concentration is at least 42% by weight, then steam may be produced in this self-feeding combustion process.

Although the process according to the invention obviates the need for additional sources of energy (since it is a self-feeding combustion process), it does not exclude the additional burning of solid or liquid organic waste which must be disposed of or the introduction of water for cooling into the fluidized bed furnace to increase the throughput of organic residues to be burned. Heat recovery methods may, of course, also be employed to make more complete use of the energy.

The invention is further illustrated with the aid of the following examples. The invention, which is set forth in the foregoing disclosure is not to be construed or limited either in spirit or in scope by these examples. Those skilled in the art will readily understand that known variations of the conditions and processes of the following procedures can be used. Percentages are percentages by weight unless otherwise indicated.

PREFERRED EMBODIMENTS OF THE INVENTION

EXAMPLE 1

Sewage sludge (2400 kg/h) having a water content of 79.8% and TDI residue (1100 kg/h) having a water content of 7% were introduced at a controlled temperature by means of a paddle screw into the head of a fluidized bed furnace having a grate surface area of 7 $m^2$.

An average solids content of 43% was established in the process so that combustion could be carried out without the addition of external sources of energy.

Air, which served both for fluidizing and for combustion, was injected as cold air through the nozzle base. The level of $SO_2$ and HCl in the flue gas was reduced by the controlled injection of very finely divided sodium hydroxide solution and chlorine bleach into the hot stream of exhaust gas.

The following operational parameters were measured:

| | |
|---|---|
| Temperature in fluidized bed | 790° C. |
| Temperature in oven space | 980° C. |
| Oxygen ($O_2$) in exhaust gas | 8.5% |
| Sulfur dioxide ($SO_2$) in exhaust gas | 90 mg/$m^3_n$ |
| Hydrogen chloride (HCl) in exhaust gas | 75 mg/$m^3_n$ |
| Nitrogen oxides ($NO_x$) in exhaust gas | 110 mg/$m^3_n$. |

($m^3_n$ = Standard $m^2$ (Normal $m^3$)).

EXAMPLE 2

The fluidized bed furnace was operated as in Example 1, except that the TDI residue was transported pneumatically through an injector situated above the fluidized bed and the sewage sludge was introduced into the furnace head at a controlled temperature. The air for combustion and fluidization was preheated to 400° C.

| | |
|---|---|
| Quantity of sewage sludge | 2400–2700 kg/h |
| Quantity of TDI residue | 1370 kg/h |
| Temperature in fluidized bed | 940° C. |
| Temperature in furnace chamber | 1020–1060° C. |
| Oxygen ($O_2$) in exhaust gas | 4–5% |
| Sulfur dioxide ($SO_2$) in exhaust gas | 60 mg/$m^3_n$ |
| Hydrogen chloride (HCl) in exhaust gas | 65 mg/$m^3_n$ |
| Nitrogen oxides ($NO_x$) in exhaust gas | 135 mg/$m^3_n$. |

EXAMPLE 3

Sewage sludge and TDI residue were introduced into the head of the furnace using a paddle screw as in Example 1. The TDI residue was temperature controlled and the fluidized bed furnace was operated with cold air.

The following operational parameters were measured:

| | |
|---|---|
| Quantity of sewage sludge | 800 kg/h |
| Quantity of TDI residue | 670 kg/h |
| Temperature in fluidized bed | 770° C. |
| Temperature in furnace chamber | 870° C. |
| Oxygen ($O_2$) in exhaust gas | 9.1–9.3% |
| Sulfur dioxide ($SO_2$) in exhaust gas | 85 mg/$m^3_n$ |
| Hydrogen chloride (HCl) in exhaust gas | 70 mg/$m^3_n$ |
| Nitrogen oxides ($NO_x$) in exhaust gas | 80 mg/$m^3_n$. |

What is claimed is:

1. A process for the combustion of aqueous sewage sludges comprising burning in a fluidized bed furnace an aqueous mixture of a sewage sludge and a TDI residue, said aqueous mixture having a total solids content of from 25 to 98% by weight based on the weight of said aqueous mixture, wherein the TDI residue comprises from 25 to 95% by weight of said total solids content.

2. A process according to claim 1 wherein no additional energy sources are supplied to the aqueous mixture.

3. A process according to claim 1 wherein the aqueous mixture has a total solids content of from 35 to 95% by weight based on the weight of said aqueous mixture.

4. A process according to claim 1 wherein the TDI residue comprises from 45 to 85% by weight of the total solids content.

5. A process according to claim 1 wherein water for cooling is introduced into the fluidized bed furnace.

6. A process according to claim 1 wherein the TDI residue is chemically modified before burning.

7. A process according to claim 1 for the combustion of aqueous sewage sludges comprising burning in a fluidized bed furnace in the absence of additional energy sources an aqueous mixture of a sewage sludge and a TDI residue, said aqueous mixture having a total solids content of from 35 to 95% by weight based on the weight of said aqueous mixture, wherein the TDI residue comprises from 45 to 85% by weight of the total solids content.

8. A process according to claim 7 wherein water for cooling is introduced into the fluidized bed furnace.

* * * * *